US005478208A

United States Patent [19]
Kasai et al.

[11] Patent Number: 5,478,208
[45] Date of Patent: Dec. 26, 1995

[54] SUBMERSED JET PUMP METHOD FOR GENERATING A STREAM OF WATER

[75] Inventors: Hironao Kasai; Katutoshi Yoshinaga, both of Nagasaki, Japan

[73] Assignees: Mitsubishi Jukogyo Kabushiki Kaisha; Marine Giken Co., Ltd., both of Tokyo, Japan

[21] Appl. No.: 364,234

[22] Filed: Dec. 27, 1994

Related U.S. Application Data

[62] Division of Ser. No. 144,396, Nov. 2, 1993, Pat. No. 5,147,550.

[51] Int. Cl.$^6$ ................................. F04F 5/02; E02B 3/04
[52] U.S. Cl. ................................. 417/53; 417/151; 4/491; 4/904; 405/22
[58] Field of Search .................. 417/151, 197, 417/53; 4/491, 492, 904; 405/22

[56] References Cited

U.S. PATENT DOCUMENTS

| 241,710 | 5/1881 | Parson | 417/174 |
|---|---|---|---|
| 1,491,057 | 4/1924 | Myers | 417/174 |
| 3,148,509 | 9/1964 | Laurie | 405/22 |
| 4,375,337 | 3/1983 | Yerger | 4/491 |
| 4,548,525 | 10/1985 | Priebe | 417/151 |
| 4,561,133 | 12/1985 | Laing | 4/491 |
| 4,957,392 | 9/1990 | Bailard et al. | 405/22 |
| 5,211,508 | 5/1993 | Makino | 405/22 |

Primary Examiner—Richard A. Bertsch
Assistant Examiner—Roland G. McAndrews, Jr.
Attorney, Agent, or Firm—Wenderoth, Lind & Ponack

[57] ABSTRACT

An apparatus for generating a stream in a body of water has at least one cylinder installed under water, and a water-jet pump housed in the cylinder. The pump draws water in through one end of the cylinder and produces a stream of water accelerated by a driving fluid supplied from an external source. The stream is discharged through another end of the cylinder to promote a flow in the body of water.

7 Claims, 18 Drawing Sheets

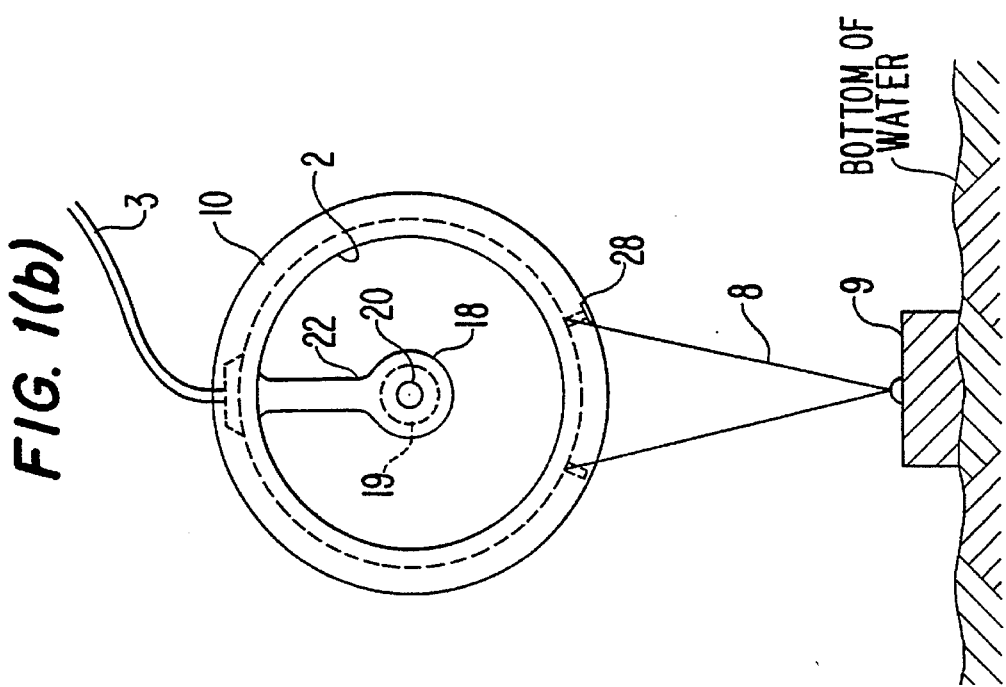
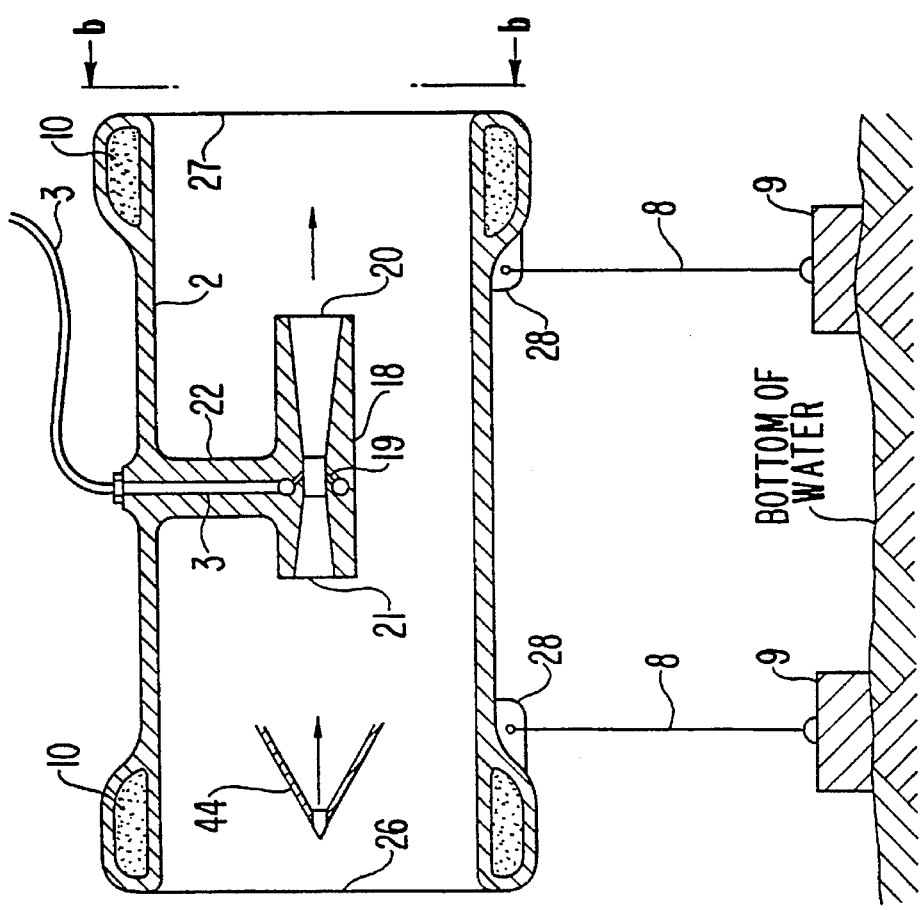

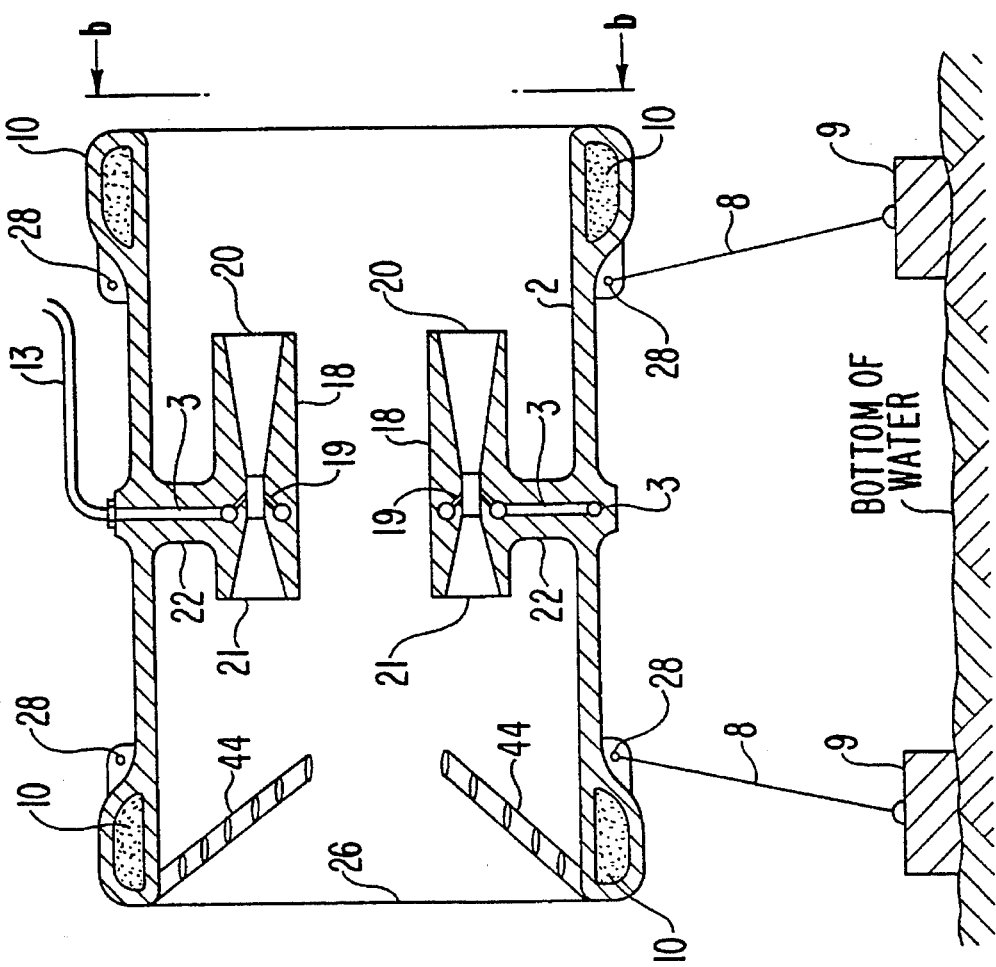
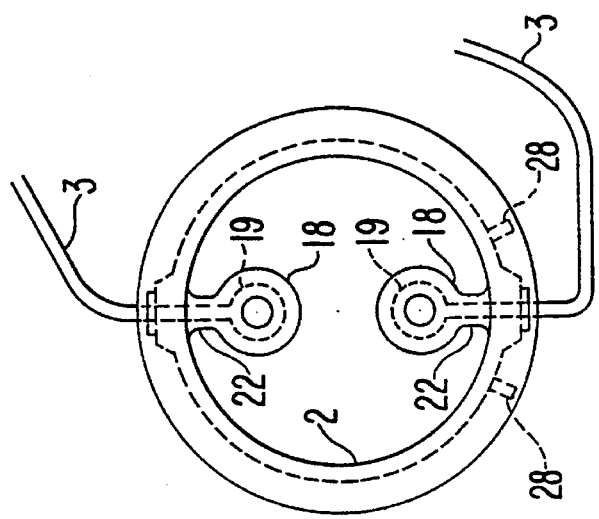

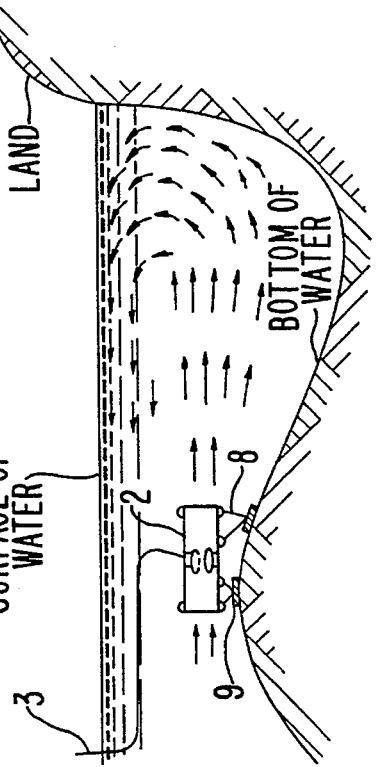
FIG. 7(a)
FIG. 7(b)
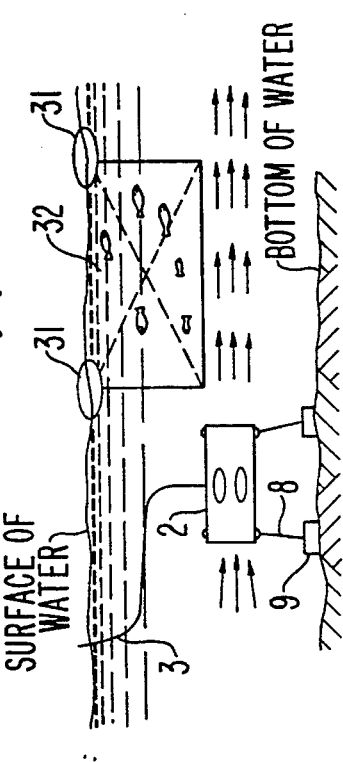
FIG. 6(a)
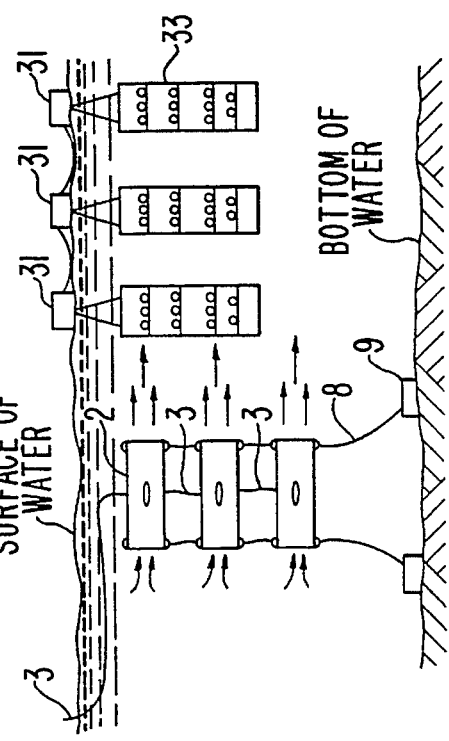
FIG. 6(b)

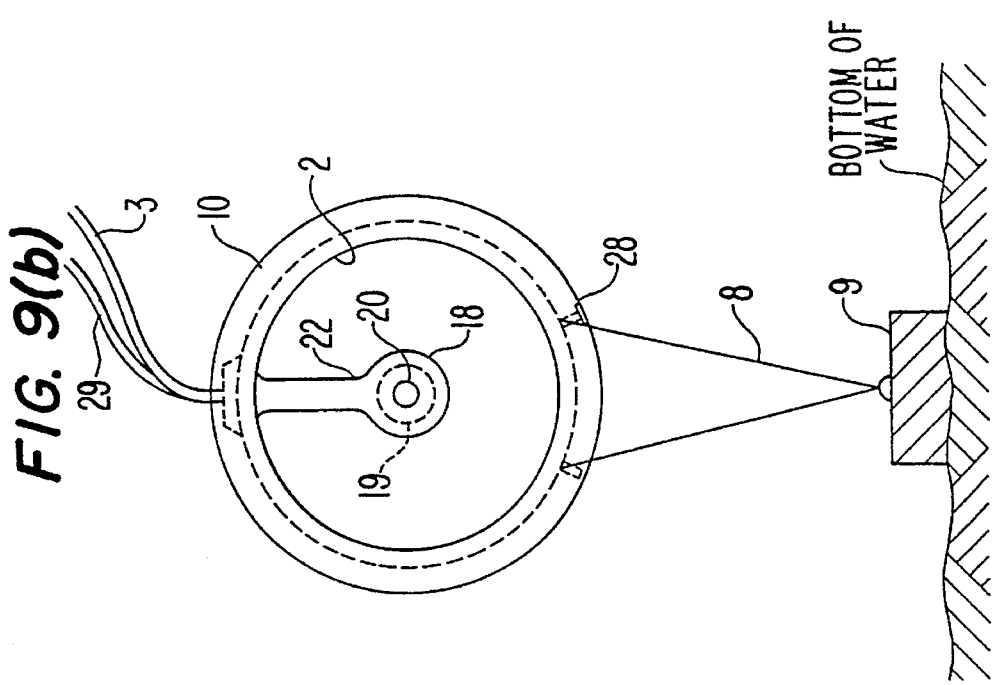
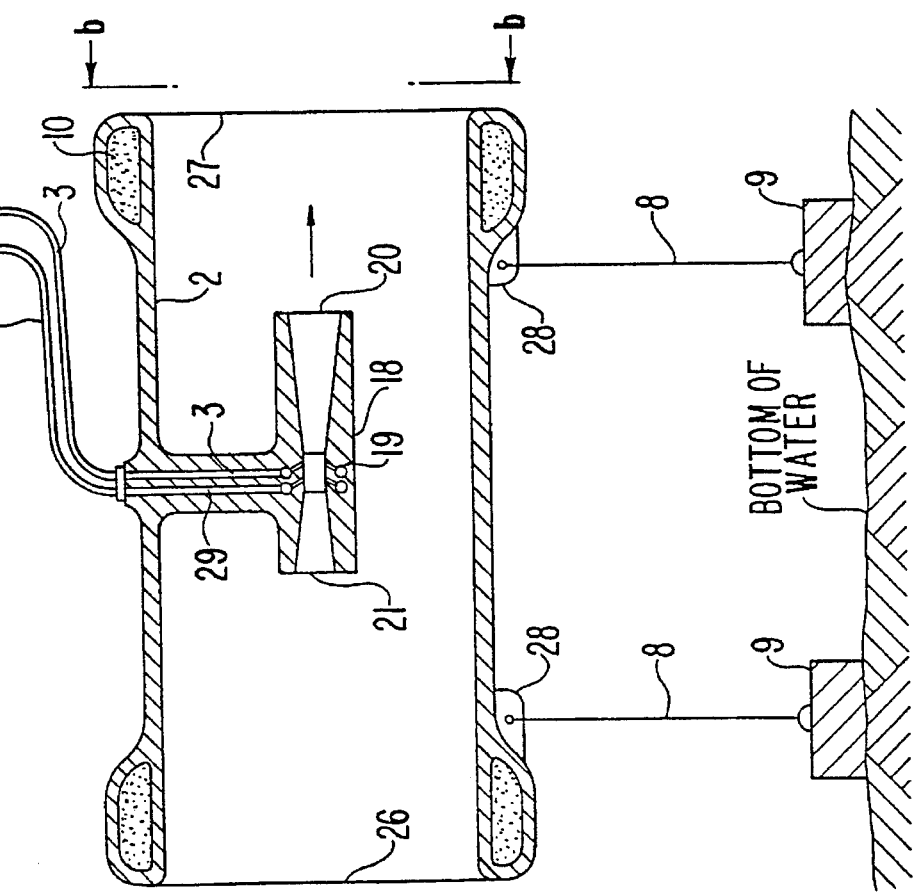

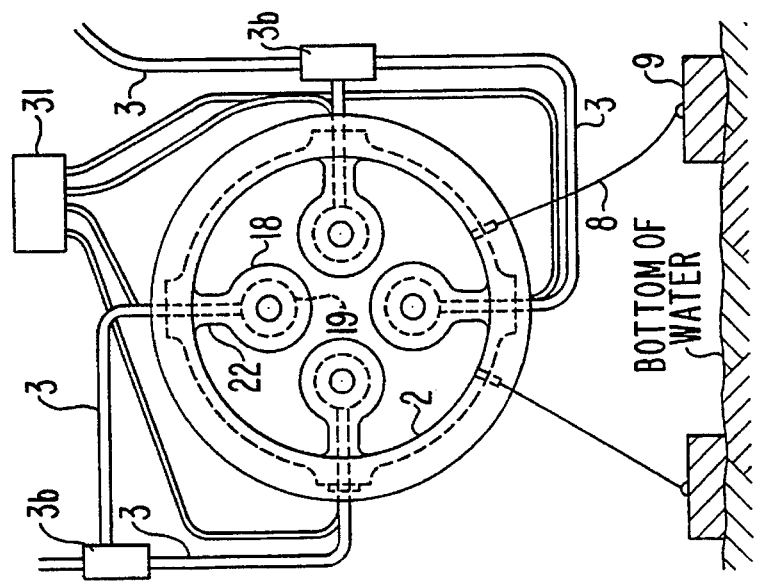
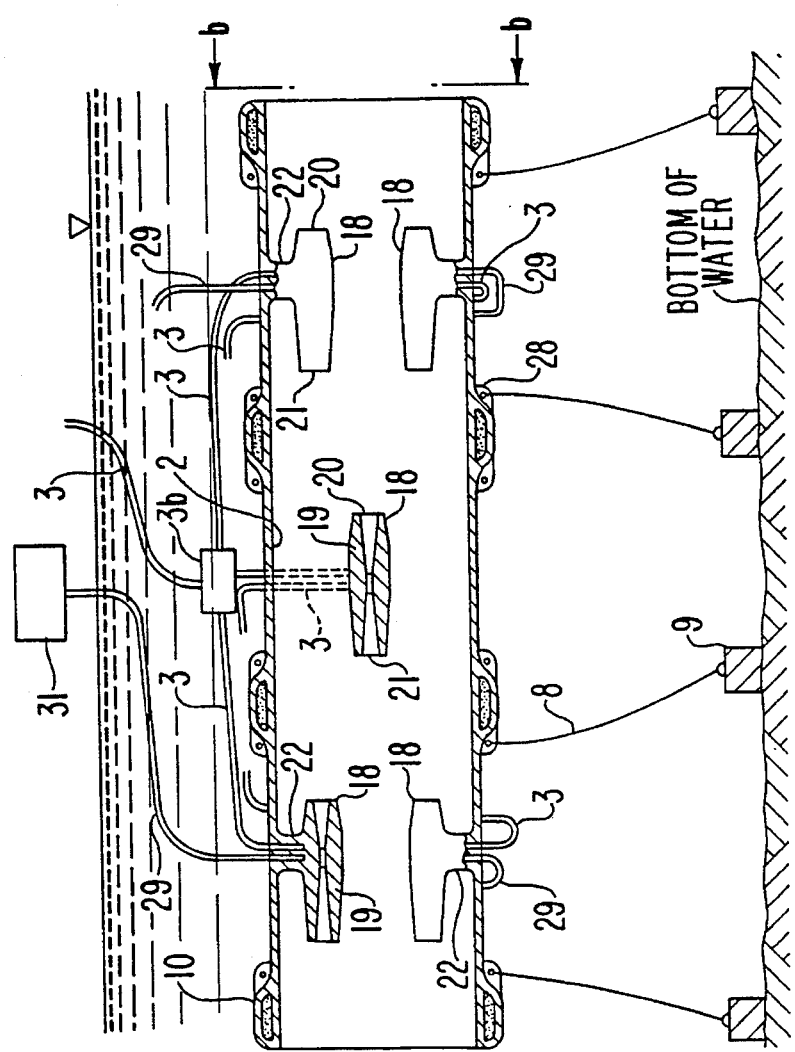
FIG. 12(b)
FIG. 12(a)

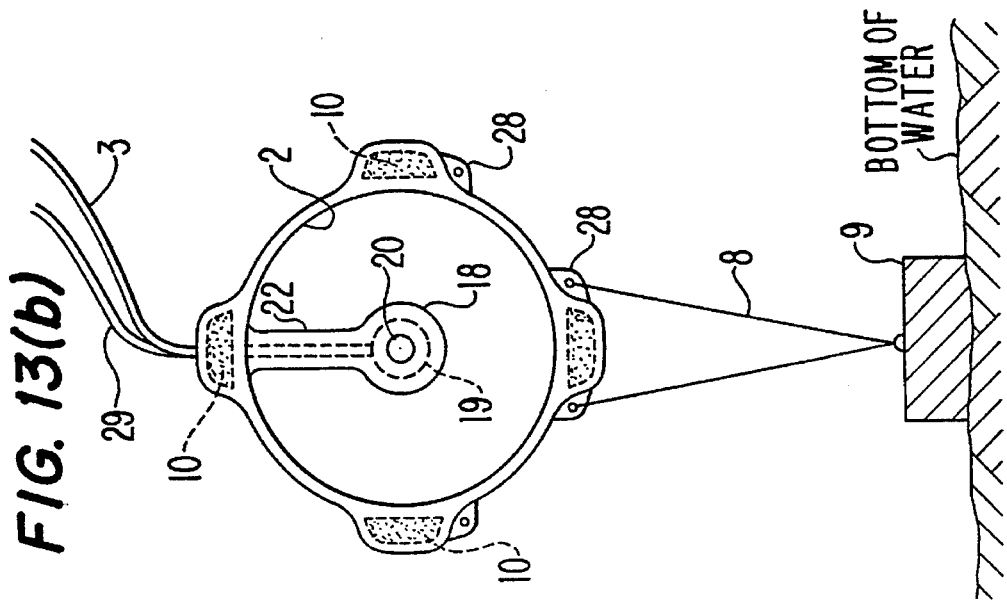
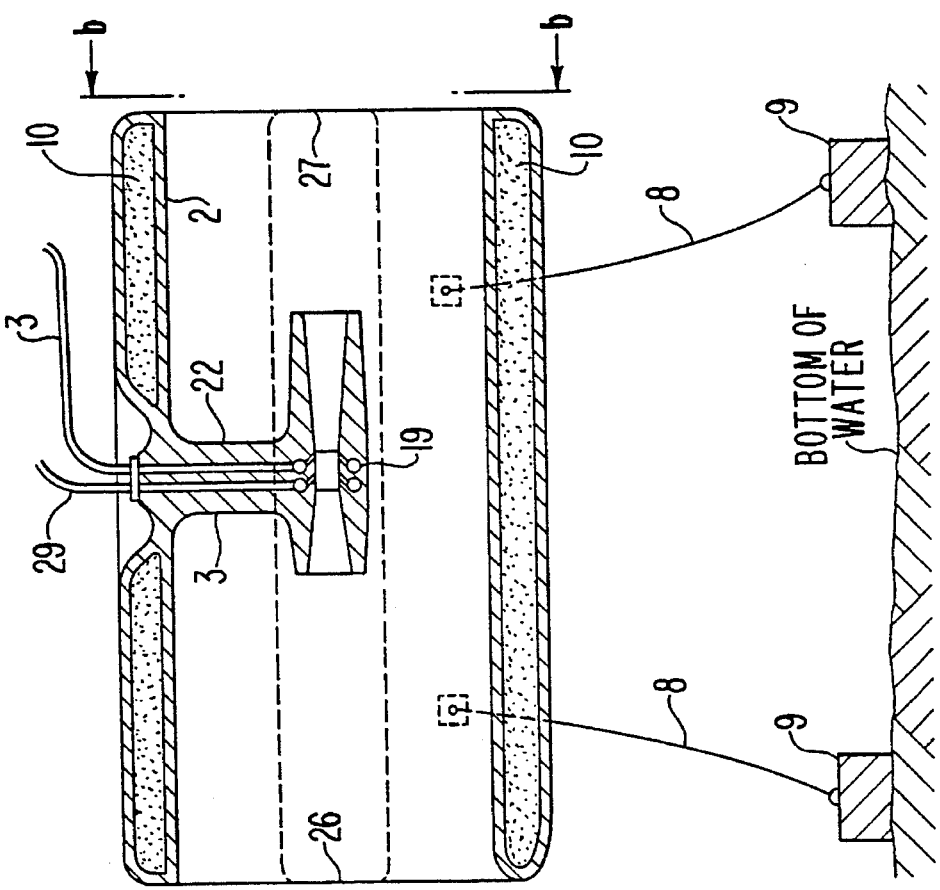

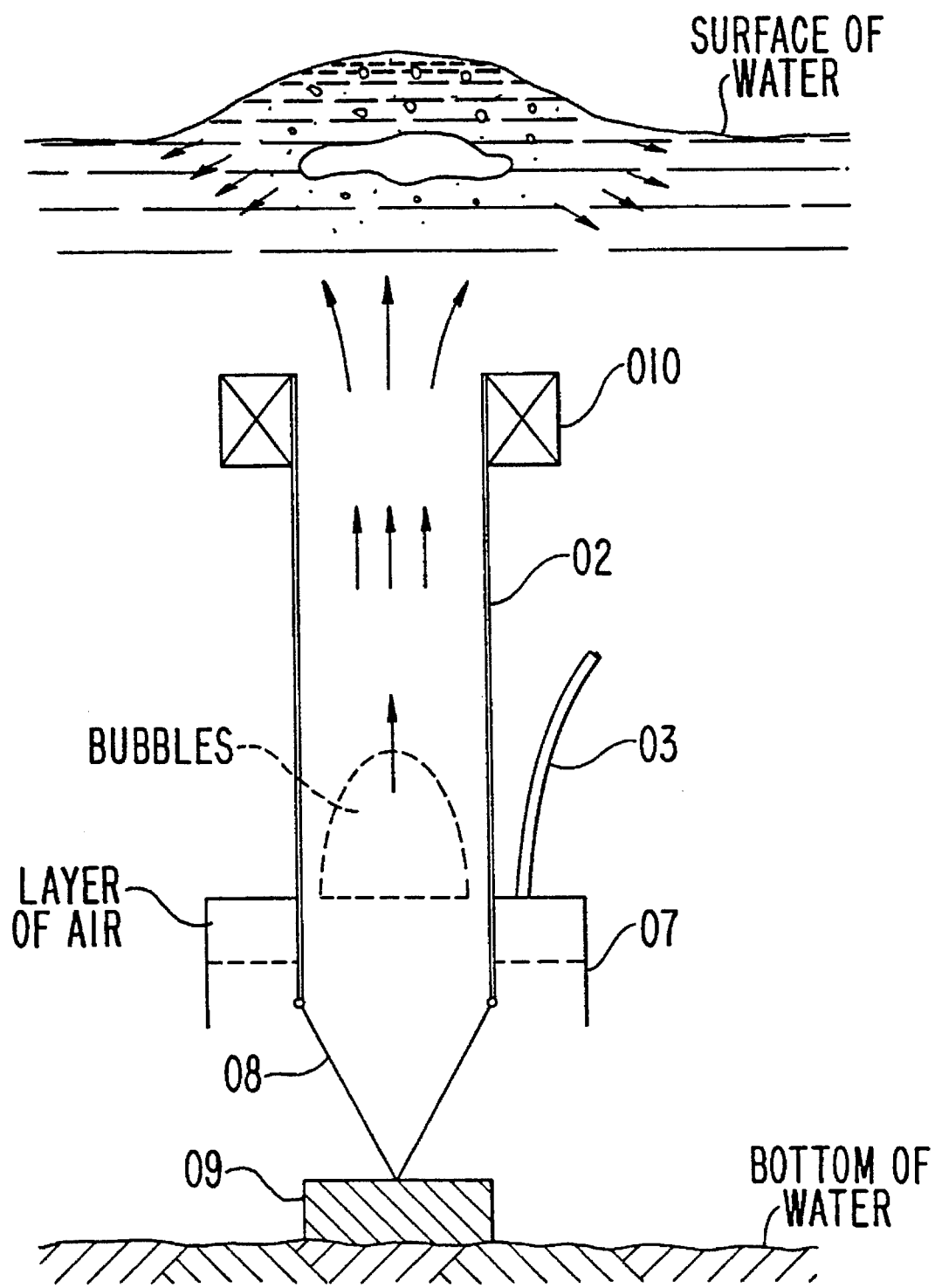

5,478,208

SUBMERSED JET PUMP METHOD FOR GENERATING A STREAM OF WATER

This is a divisional application of Ser. No. 08/144,396, filed Nov. 2, 1993, now U.S. Pat. No. 5,147,550.

BACKGROUND OF THE INVENTION

1. Field of the Invention

This invention relates to an apparatus for generating a stream of water in a closed area, such as a lake, pond, tank, pool, harbor, or fish farm, to promote the flow of water and purify it.

2. Description of the Prior Art

A known apparatus for generating a stream of water is schematically shown in FIG. 24 of the accompanying drawings. The apparatus includes a hollow cylinder 02 held in an upright position by a buoy 010, a wall surrounding the cylinder 02 at its lower end and defining an air chamber 07 which is open at its bottom, a sinker 09 to which the cylinder 02 is moored by ropes 08, and a pipe 03 connected to the air chamber 07 for supplying compressed air thereinto. Compressed air is intermittently supplied into the air chamber 07 to build up a layer of air therein until the air flows over the lower end of the cylinder 02, enters it and forms a large mass of bubbles therein. As the bubbles rise, an upwardly flowing stream of water is created through the cylinder 02, so that the water staying near the bottom of a body of water in which the apparatus is installed is replaced by a downwardly flowing stream of water.

The movement of water by the apparatus as shown in FIG. 24 is, however, not only intermittent, but also, as a rule, only vertical. Although a horizontally diffused stream is produced near the surface of the body of water, it is a secondary stream produced by the particles of the rising water striking against the air above the surface of the body of water, and is, therefore, too weak to perform any effective horizontal stirring of water.

Another known apparatus is shown in FIG. 25(a). It comprises a hollow cylinder 02 connected to a water tunnel, a drive shaft 015 which is rotatable by an electric motor, or other prime mover, a bevel gear device 016 connected to the drive shaft 015, a shaft 017 which is driven by the bevel gear device 016, an impeller 014 which is driven by the shaft 017 to generate a stream of water, and a strut 023 securing to the cylinder 02 a nacelle housing the bevel gear device 016, etc. A modified form of apparatus is shown in FIG. 25(b), and includes an electric motor 024 connected to the shaft 017, and a set of cables 025 connected between the motor 024 and a power supply.

The apparatus as shown in FIG. 25 (a) or (b) is used with, for example, a ship, or a machine for civil engineering work in water, and can produce a stream of water flowing in any desired direction including vertical or horizontal. It is, however, a complicated apparatus including a prime mover and other precise driving devices, and is, therefore, often difficult to use for a long time under water, as at the bottom of the sea. Moreover, it cannot aerate water, as the water which is caused to flow does not effectively contact air.

SUMMARY OF THE INVENTION

Under these circumstances, it is an object of this invention to provide an apparatus for generating a stream of water which does not have any prime mover, propeller, or other mobile device or part installed under water, but has a long service life without calling for any particular maintenance.

It is another object of this invention to provide an apparatus which can produce a stream of water flowing in any desired direction.

It is still another object of this invention to provide an apparatus which can produce a stream of effectively aerated water without the aid of any particular aerating device.

It is a further object of this invention to provide an apparatus which can produce a strong stream of water flowing vertically or horizontally, or in any other direction between vertical and horizontal, or a plurality of streams of water flowing in different directions.

To achieve these objects of the invention, there is provided an apparatus which comprises a hollow cylinder for discharging a stream of water in a specific direction, and a water-jet pump mounted in the cylinder for producing a stream of water accelerated by a driving fluid supplied from an external source. The apparatus can produce a strong stream of water flowing in any desired direction without the aid of any prime mover, or other driving device having a moving part, or parts.

According to a preferred aspect of this invention, the water-jet pump is connected to a pipe for introducing a gas into the pump, so that the gas may be mixed with the driving fluid in the pump and thereby aerate water. The apparatus can thus produce a stream of effectively aerated water.

According to another preferred aspect of this invention, the cylinder is so curved that the apparatus may discharge a strong and effective stream of water vertically or horizontally, or in any other direction between vertical and horizontal.

According to still another aspect of this invention, the cylinder has a plurality of outlets facing in different directions to discharge a plurality of strong streams of water in the different directions.

These and other features and advantages of this invention will become apparent from the following description and the accompanying drawings.

BRIEF DESCRIPTION OF THE DRAWINGS

FIG. 1(a) is a longitudinal section view of a first embodiment of an apparatus for generating a stream of water according to this invention;

FIG. 1(b) is an elevational view of the apparatus taken in the direction of line b—b of FIG. 1(a);

FIG. 3(a) is a longitudinal sectional view of a modified form of the first embodiment of this invention;

FIG. 3(b) is an elevational view of the apparatus taken in the direction of line b—b of FIG. 3(a);

FIGS. 6(a) and 6(b) are each a schematic representation of a mode of using the first embodiment of this invention;

FIGS. 7(a) and 7(b) are each a schematic representation of another mode of using the first embodiment of this invention;

FIG. 9(a) is a longitudinal sectional view of a second embodiment of an apparatus for generating a stream of water according to this invention;

FIG. 9(b) is an elevational view of the apparatus taken in the direction of line b—b of FIG. 9(a);

FIG. 12(a) is a longitudinal sectional view of another modified form of the second embodiment of this invention;

FIG. 12(b) is an elevational view of the apparatus taken in the direction of line b—b of FIG. 12(a);

FIG. 13(a) is a longitudinal sectional view of still another modified form of the second embodiment of this invention;

FIG. 13(b) is an elevational view of the apparatus taken in the direction of line b—b of FIG. 13(a);

FIG. 24 is a schematic longitudinal sectional view of a known apparatus; and

DETAILED DESCRIPTION OF THE PREFERRED EMBODIMENT

Figure 2:
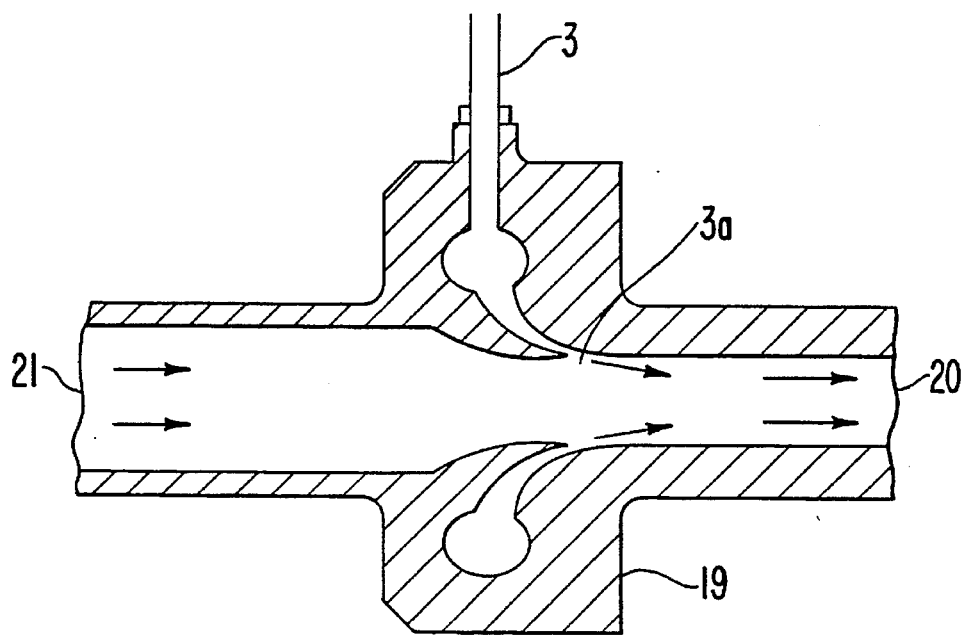
FIG. 2 is a longitudinal sectional view of a water-jet pump.
Figure 4:
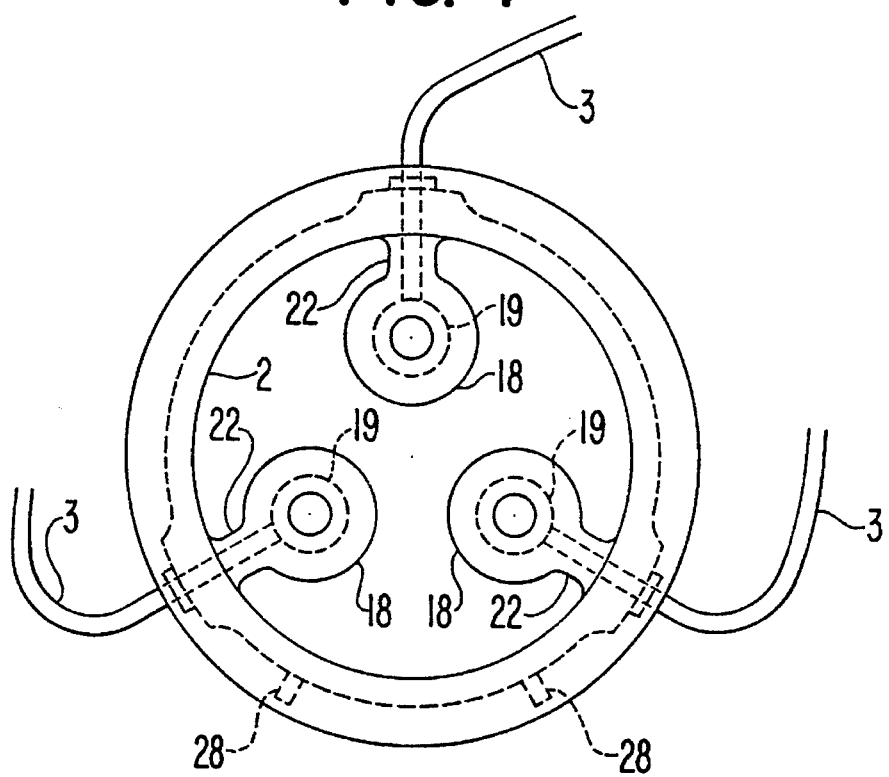
FIG. 4 is a front elevational view of another modified form of the first embodiment of this invention.
Figure 5:
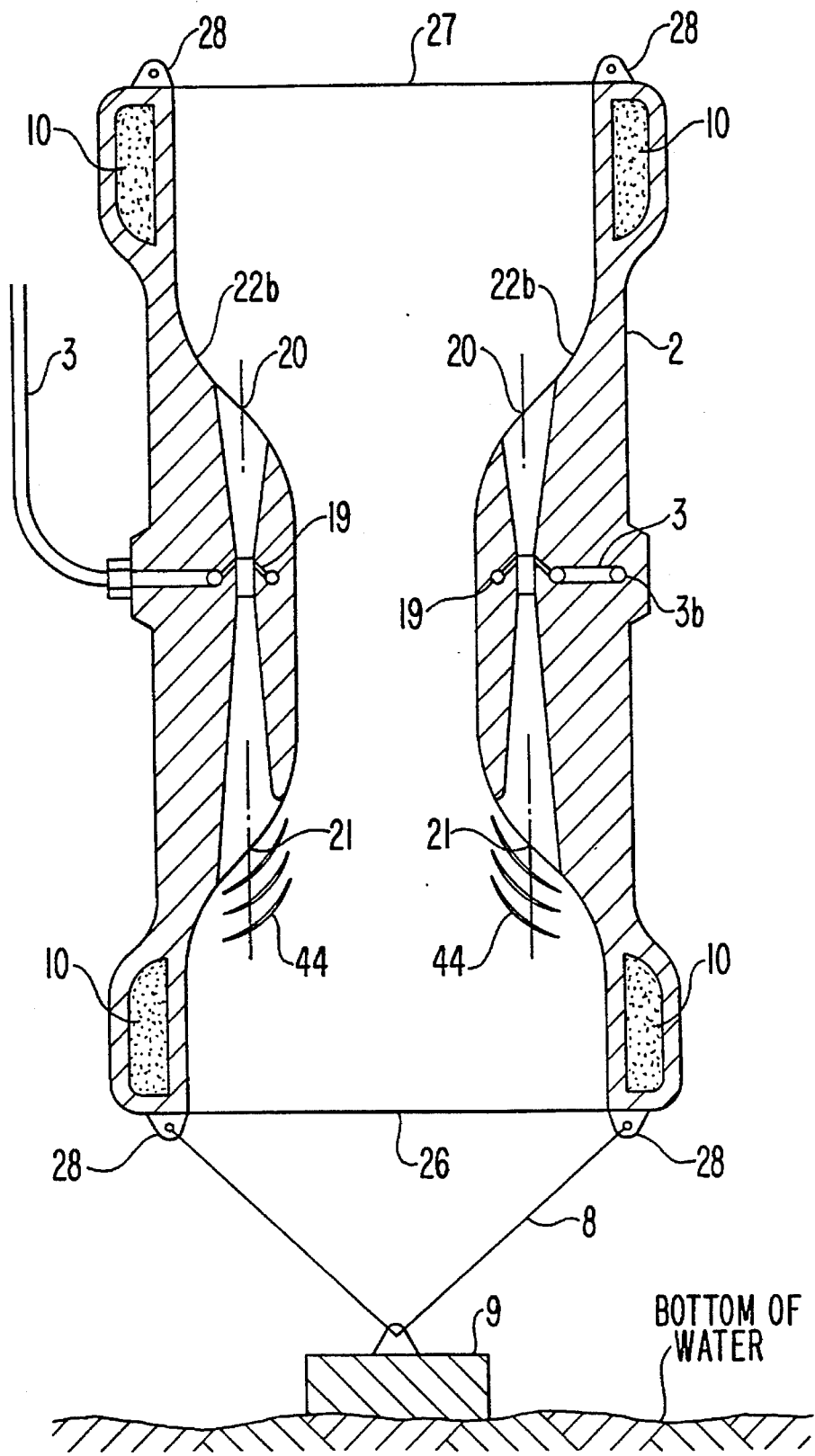
FIG. 5 is a longitudinal sectional view of still another modified form of the first embodiment of this invention.

The first embodiment of this invention is basically shown in FIGS. 1(a), 1(b) and 2. It comprises a hollow cylinder 2 and a nacelle 18 supported in the cylinder 2 coaxially therewith. The nacelle 18 forms a housing of a water-jet pump 19 and has an inlet end 21 and an outlet end 20, while the cylinder 2 also has an inlet end 26 and an outlet end 27. A pipe 3 is connected to the water-jet pump 19 for supplying it with a driving fluid, so that the pump 19 may draw water in through the inlet end 21, produce an accelerated stream of water, and discharge it through the outlet end 20. The driving fluid may be air, or water, or a mixture thereof. The nacelle 18 is supported by a strut 22 connected to the cylinder 2. The cylinder 2 is provided with a buoyant material 10, and moored to sinkers 9 by ropes 8 fastened to plates 28 in eyelets thereof. The pipe 3 terminates in a nozzle opening 3a through which a jet of driving fluid is supplied into the pump 19 to produce a stream of water. A rubbish collector 44 is provided in the cylinder 2 upstream of the nacelle 18.

The apparatus relying upon the water-jet pump 19 for generating a stream of water has a simple structure and long service life without calling for any particular maintenance, since it does not include any prime mover, or other complicated driving device having a moving part or parts. It can produce a powerful and effective stream of water vertically or horizontally, or in any other direction between vertical and horizontal, if the cylinder 2 is appropriately positioned. The apparatus can produce a stream of aerated water without the aid of any aerating device if air, or a mixture of air and water is used as the driving fluid for the water-jet pump 19, or if water having a high content of dissolved oxygen is taken from the surface layer of a body of water in which the apparatus is installed, and used as the driving fluid for supplying a stream of aerated water to the bottom region having a low content of dissolved oxygen.

The stream leaving the cylinder 2 hardly exerts any adverse effect on any life under water, since it flows calmly and steadily without loss caused by striking against the air above the surface of the water. The apparatus including the cylinder 2, mooring ropes 8 and sinkers 9 can be used to form a complex marine structure defining a gathering place for fish and providing indirect protection and residence to them.

A few modified forms of the first embodiment of this invention are shown by way of example in FIGS. 3(a) to 5. The modified apparatus are substantially identical in structure, use and effect to the basic form of apparatus shown in FIGS. 1(a) to 2, and, therefore, only the features which differentiate them from the basic apparatus will be described.

The apparatus shown in FIGS. 3(a) and 3(b) has two water-jet pumps 19 in parallel to each other and each having a longitudinal axis deviating from that of a hollow cylinder 2, and can produce a stronger stream of water. The apparatus shown in FIG. 4 has three water-jet pumps 19 parallel to one another and equally spaced apart from one another about the longitudinal axis of a hollow cylinder 2, and can produce a still stronger stream of water. The apparatus shown in FIG. 5 has a structure similar to that of FIG. 3(a) but has no strut 22. Each strut 22 is replaced by an inward protrusion 22b of the wall of a hollow cylinder 2, while a pipe 3 for supplying a driving fluid has a portion 3b formed in the wall of the cylinder 2. The apparatus shown in FIG. 5 has, therefore, a lower resistance to the flow of water through the cylinder 2.

Several modes of using the first embodiment of this invention are shown by way of example in FIGS. 6(a) to 8. FIG. 6(a) shows the apparatus installed near a structure suspended from floats 31 and defining a fish preserve 32. FIG. 6(b) shows the apparatus installed near shelves 33 suspended from floats 31 for the culture of shellfish.

FIGS. 7(a) and 7(b) each show the apparatus installed in a highly closed area such as the innermost part of a bay. The cylinder 2 is provided at each end thereof with a mooring rope 8 and a sinker 9, and the effective length of the ropes 8 are adjustable to hold the cylinder 2 in an appropriate position along the inclined surface of the bottom of the bay.

Figure 8:
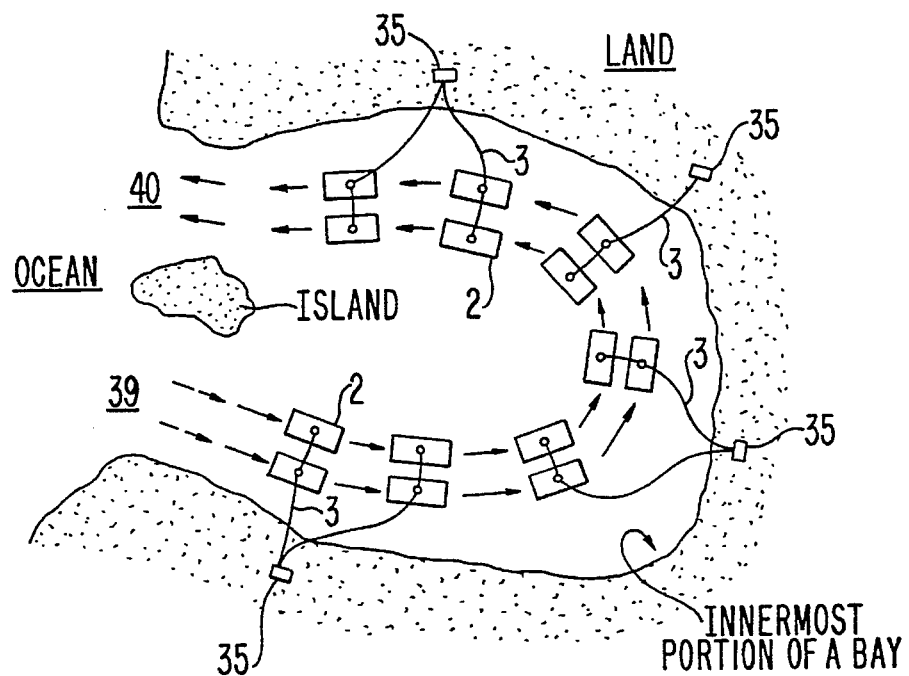
FIG. 8 is a schematic representation of still another mode of using the first embodiment of this invention.

FIG. 8 shows a plurality of units of apparatus installed in a bay alongside the land, and a plurality of pumps 35 installed on the land for supplying a driving fluid to water-jet pumps. The apparatus cooperate with one another to produce a circulating stream of water flowing into the bay as shown by arrows 39, and flowing out as shown by arrows 40, and thereby effectively move the seawater which would otherwise be difficult to circulate and would remain stagnant in the bay.

Figure 10:
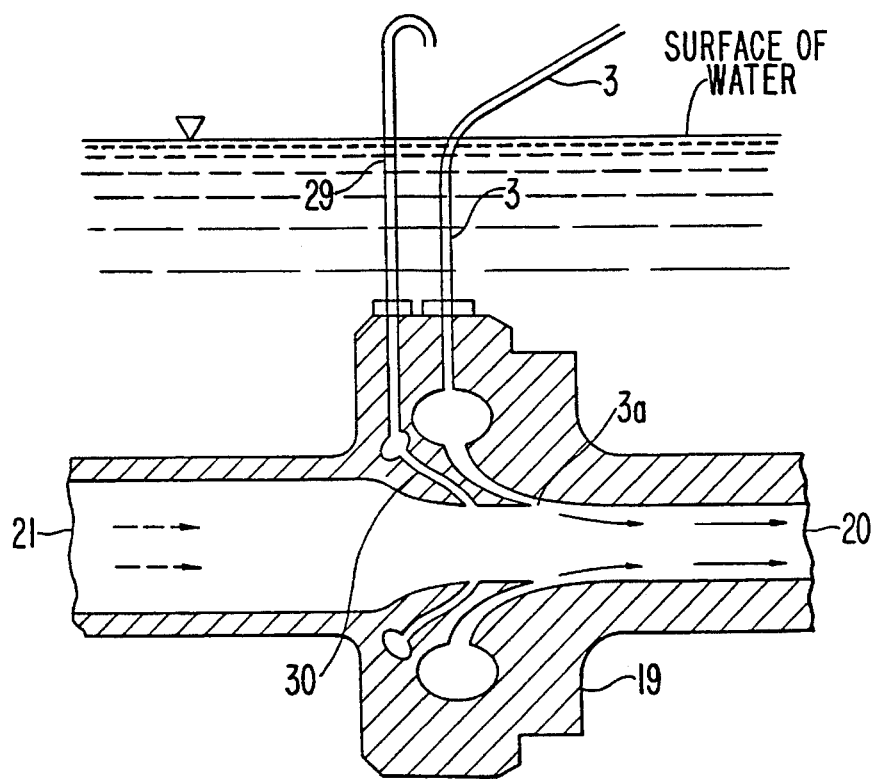
FIG. 10 is a longitudinal sectional view of a water-jet pump.

The second embodiment of this invention is basically shown in FIGS. 9(a), 9(b) and 10. It is used to produce a stream of aerated water having an improved level of purity in a closed area. The apparatus comprises a hollow cylinder 2 and a nacelle 18 supported in the cylinder 2 coaxially therewith. The nacelle 18 houses a water-jet pump 19 and has an inlet end 21 and an outlet end 20, while the cylinder 2 also has an inlet end 26 and an outlet end 27. A pipe 3 is connected to the water-jet pump 19 for supplying it with water as a driving fluid, so that the pump 19 may draw water in through the inlet end 21, produce an accelerated stream of water, and discharge it through the outlet end 20. The nacelle 18 is supported by a strut 22 connected to the cylinder 2. The cylinder 2 is provided with a buoyant material 10, and moored to sinkers 9 by ropes 8 fastened to plates 28 in eyelets therefore. The pipe 3 terminates in a nozzle opening 3a through which a jet of driving fluid is supplied into the pump 19 to produce a stream of water. Another pipe 29 is connected to the water-jet pump 19 for supplying it with air for aerating water, and terminates in a nozzle opening 30. The aerating air is drawn into the pump 19 through the pipe 29 when a pressure which is lower than atmospheric pressure prevails in the pump 19.

The apparatus as hereinabove described has a simple structure and long service life without calling for any particular maintenance, since it does not include any prime mover, or other complicated driving device having a moving part or parts, but relies upon the water-jet pump 19 for generating a stream of water. It can produce a powerful and effective stream of water flowing vertically or horizontally, or in any other direction between vertical and horizontal, if the cylinder 2 is appropriately positioned. The pipe 29 through which air is drawn from the atmosphere into the water-jet pump 19 enables the apparatus to produce a stream of effectively aerated water without the aid of any particular aerating device. The stream leaving the cylinder 2 hardly exerts any adverse effect on any life under water, since it flows calmly and steadily without making loss caused by striking against the air above the surface of a body of water in which the apparatus is installed.

Figure 11A:
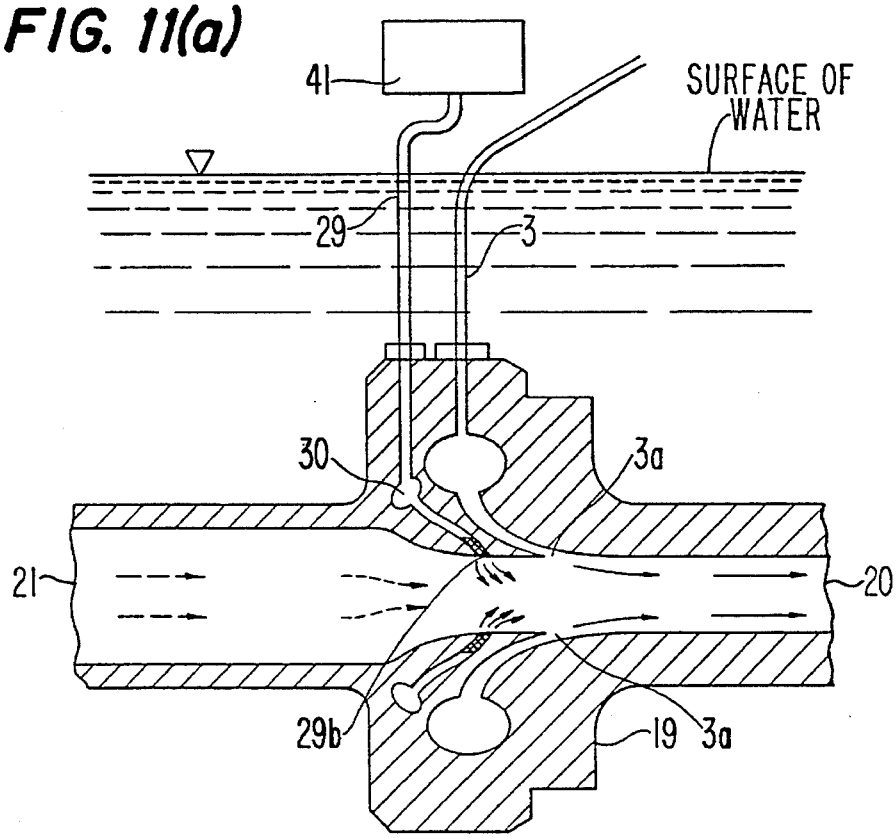
FIGS. 11(a) and 11(b) are each a longitudinal sectional view of a modified form of the second embodiment of this invention.
Figure 11B:
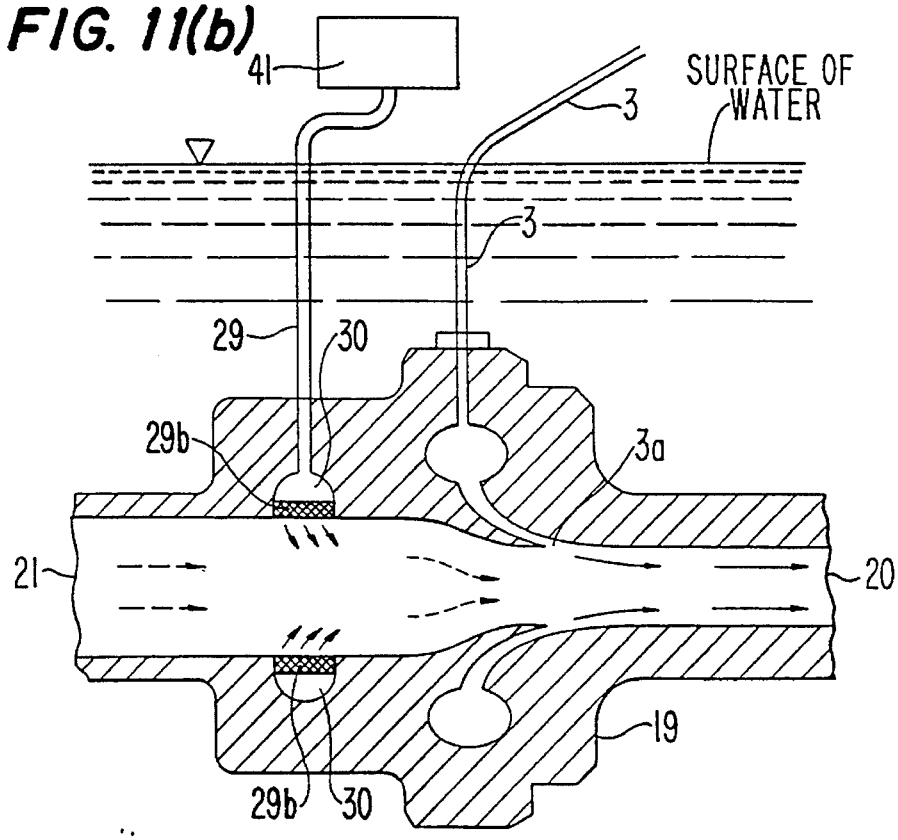

Several modified forms of the second embodiment of this invention are shown by way of example in FIGS. 11(*a*) to 14. The modified apparatus are substantially identical in structure, use and effect to the basic form of apparatus shown in FIGS. 9(*a*) to 10, and, therefore, only the features which differentiate them from the basic apparatus will be described.

The apparatus shown in FIGS. 11(*a*) and 11(*b*) each have a porous member 29b filling the outlet portion of the nozzle opening 30 and forming a part of the inner wall of the water-jet pump 19, and further includes a gas compressor 41 connected to the inlet of the pipe 29. The air, or other gas compressed to a pressure above the atmospheric level flows through the pipe 29 and the nozzle opening 30, and forms fine bubbles when passing through the porous member 29b and flowing into the water in the pump 19.

The apparatus shown in FIGS. 12 (*a*) and 12 (*b*) has five water-jet pumps 19 mounted in the cylinder 2 and facing in one and the same direction, although they are spaced apart from one another transversely and longitudinally of the cylinder 2 as shown. The five pumps 19 cooperate with one another to produce a powerful stream of water. The pipe 3 for supplying water as a driving fluid to the water-jet pumps 19 is divided by a manifold 3b into five pipes 3 each leading to one of the pumps 19. A gas compressor 31 is connected to five pipes 29 each leading to one of the pumps 19 for supplying aerating gas thereto. The pipes 3 and 29 are flexible pressure-resistant pipes, and may be enclosed in a cable laid on the outer or inner periphery of the cylinder 2.

The apparatus shown in FIGS. 13 (*a*) and 13 (*b*) is substantially identical to that shown in FIGS. 9 (*a*) and 9(*b*), but differs from it in the arrangement of the buoyant material 10. Although the buoyant material 10 shown in FIGS. 9(*a*) and 9(*b*) surrounds the cylinder 2 only at each end thereof, the buoyant material 10 shown in FIGS. 13(*a*) and 13(*b*) does not surround the cylinder 2, but extends substantially along the entire length of the cylinder 2 at four points which are equally spaced apart from one another around the cylinder 2. This arrangement enables the buoyant material 10 to produce a large force.

Figure 14:
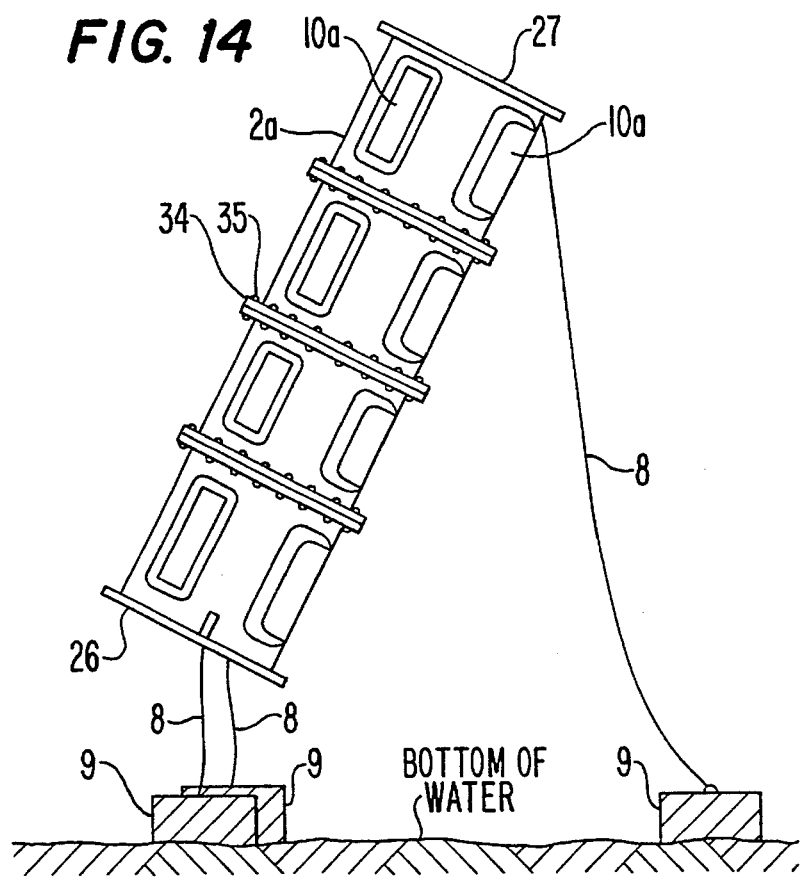
FIG. 14 is a side elevational view of a further modified form of the second embodiment of this invention.

The apparatus shown in FIG. 14 has a cylinder formed by four cylinder units 2a joined together and can produce a powerful stream of aerated water. Each cylinder unit 2a has a flange 34 at each end, and the mating flanges 34 of every two adjoining cylinder units 2a are joined together by bolts and nuts as shown at 35. Each cylinder unit 2a is provided with a buoyant material as shown at 10a.

Figure 15:
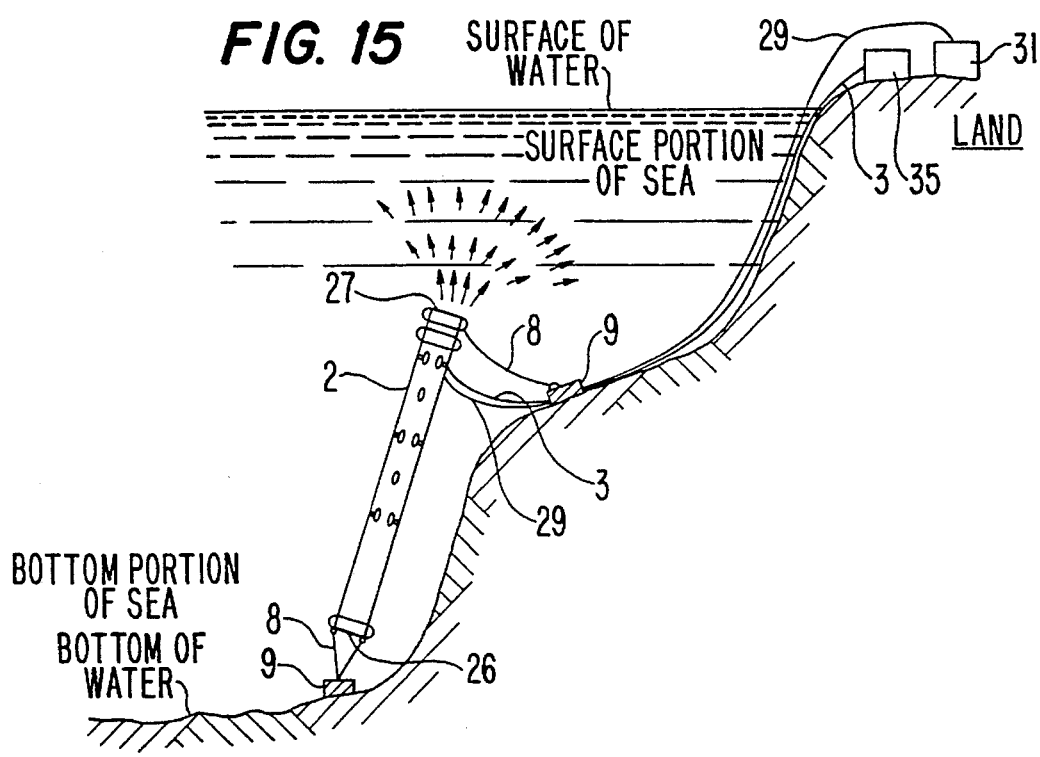
FIG. 15 is a schematic representation of a mode of using the second embodiment of this invention.

One mode of using the second embodiment of this invention is shown by way of example at FIG. 15. The apparatus is installed in the bottom of the sea to produce an upward stream of aerated seawater to thereby make an activated fishing place.

Figure 16B:
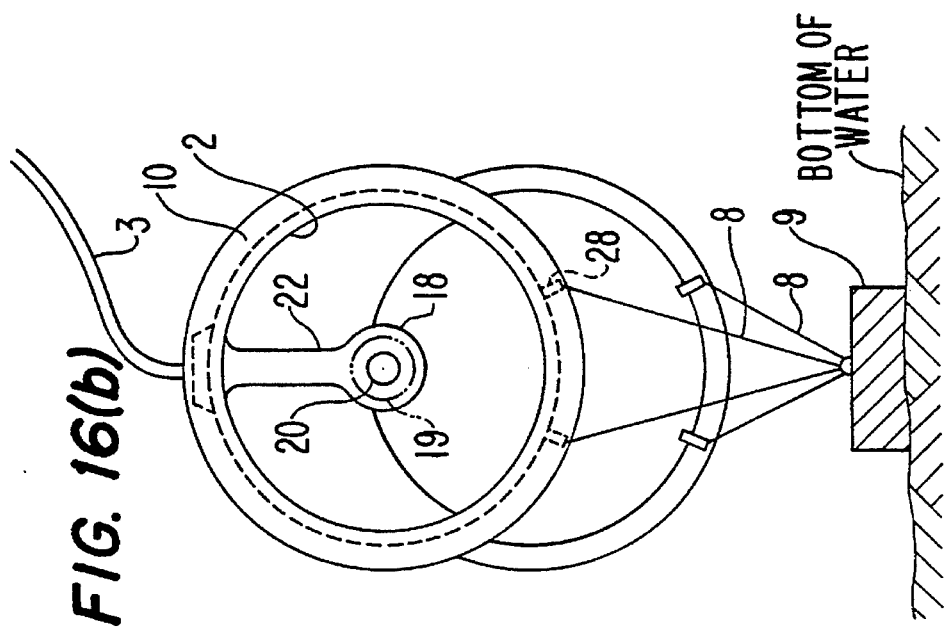
FIG. 16(b) is an elevational of the apparatus taken in the direction of line b—b of FIG. 16(a)
Figure 16A:
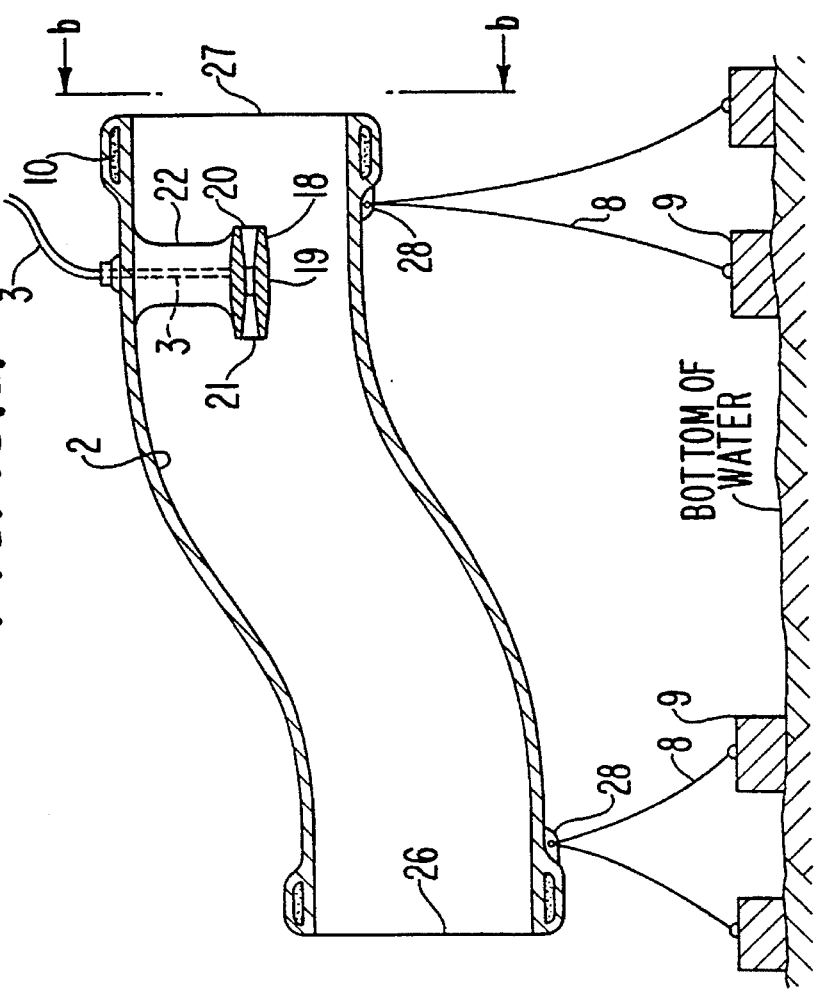
FIG. 16(a) is a longitudinal sectional view of a third embodiment of an apparatus for generating a stream of water according to this invention.

The third embodiment of this invention is basically shown in FIGS. 16(*a*) and 16(*b*). The apparatus comprises a curved hollow cylinder 2 and a nacelle 18 supported in the cylinder 2 coaxially therewith. The nacelle 18 houses a water-jet pump 19 and has an inlet end 21 and an outlet end 20, while the cylinder 2 also has an inlet end 26 and an outlet end 27. A pipe 3 is connected to the water-jet pump 19 for supplying it with a driving fluid (air or water, or a mixture thereof), so that the pump 19 may draw water in through the inlet end 21, produce an accelerated stream of water, and discharge it through the outlet end 20. The nacelle 18 is supported by a strut 22 connected to the cylinder 2. The cylinder 2 is provided with a buoyant material 10 at each end thereof, and moored to sinkers 9 by ropes 8 fastened to eye plates 28. The cylinder 2 is so positioned as to draw in and discharge a horizontal stream of water.

The apparatus as hereinabove described has a simple structure and long service life without calling for any particular maintenance, since it does not include any prime mover, or other driving device having a moving part or parts, but relies upon the water-jet pump 19 for generating a stream of water. It can produce a powerful and effective stream of water flowing vertically or horizontally, or in any other direction between vertical and horizontal, if the cylinder 2 is appropriately positioned. Moreover, it can produce a stream of effectively aerated water without the aid of any particularly aerating device if air, or a mixture of air and water is used as the driving fluid for the water-jet pump 19. The stream leaving the cylinder 2 hardly exerts any adverse effect on any life under water, since it flows calmly and steadily without any loss caused by striking against the air above the surface of a body of water in which the apparatus is installed.

Figure 17A:
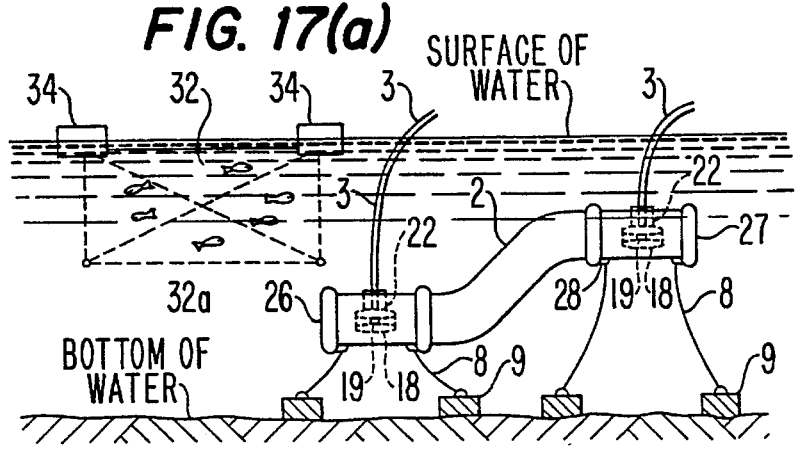
FIGS. 17(a) and 17(b) are each a schematic representation of a mode of using the third embodiment of this invention.
Figure 17B:
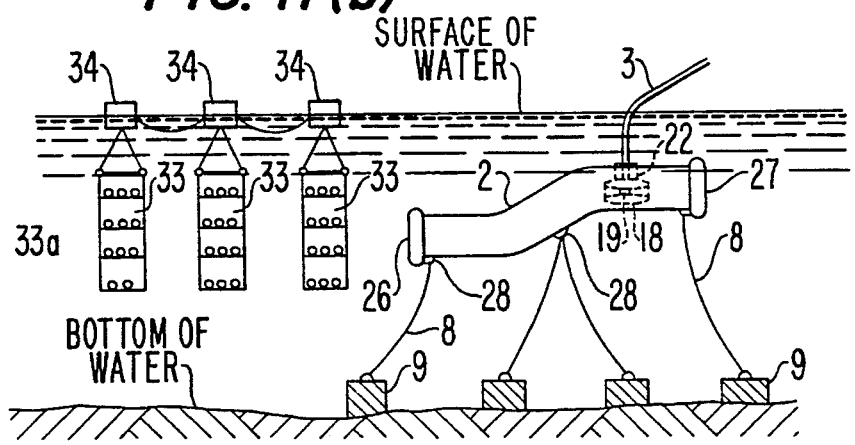

Several modes of using the third embodiment of this invention are shown by way of example in FIGS. 17(*a*) to 19. The apparatus shown in FIG. 17(*a*) is installed near a structure suspended from floats 34 and defining a fish preserve 32 to produce a steady stream of water flowing horizontally in an area 32a below the fish preserve 32. The apparatus shown in FIG. 17(*b*) is installed near shelves 33 suspended from floats 34 for the culture of shellfish to produce a steady stream of water flowing horizontally in an area 33a upstream of the shelves 33. In either event, the apparatus can move water from the area near the bottom of the sea to the area near the surface thereof, so that water may not stagnate at the bottom of the sea and form sludge.

Figure 18:
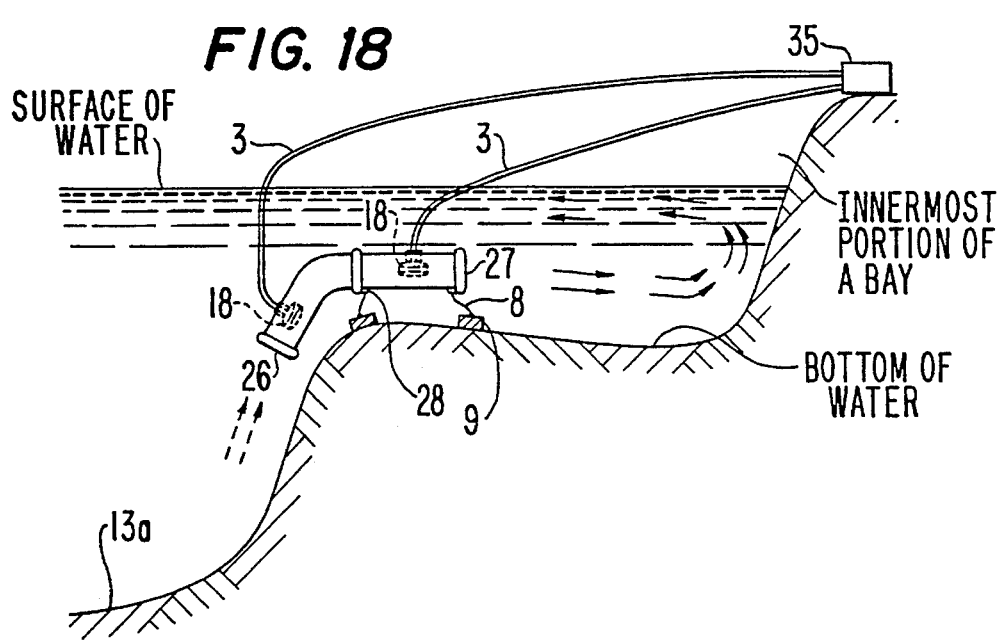
FIG. 18 is a schematic representation of another mode of using the third embodiment of this invention.

The apparatus shown in FIG. 18 is installed in a bay having a shelf extending between the land and a slope leading to the bottom 13a of the bay. It is so curved as to lie along the curved floor of the bay and draw water from a deep area near the bottom 13a to discharge a stream of water into a shallow area above the shelf to move water which would otherwise tend to stagnate in the latter area.

Figure 19:
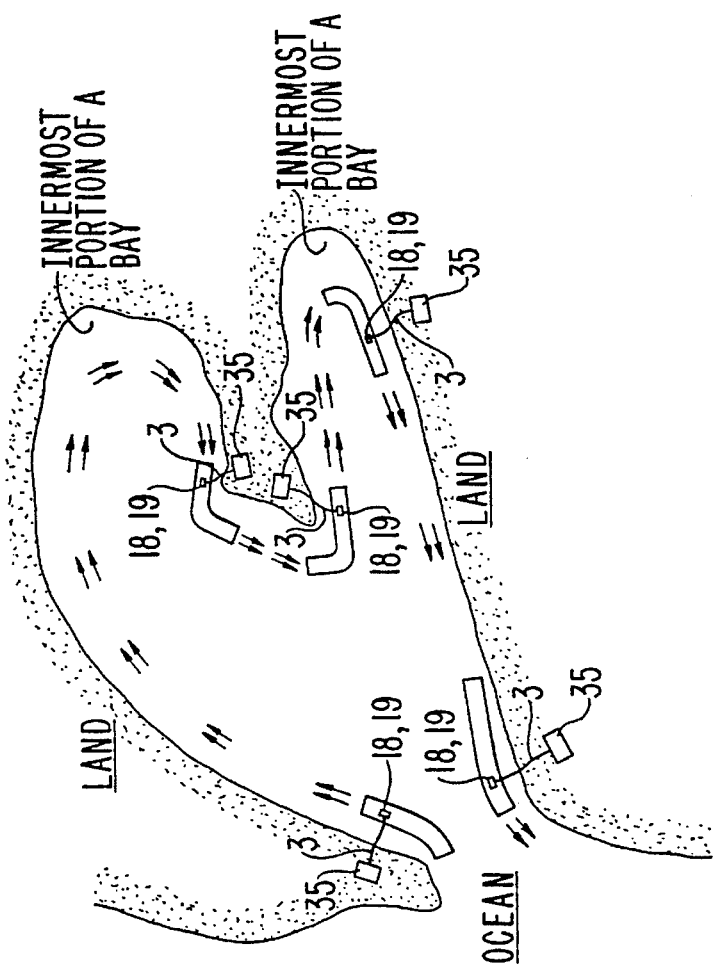
FIG. 19 is a schematic representation of still another mode of using the third embodiment of this invention.

FIG. 19 shows a plurality of apparatus installed in a bay along its irregularly shaped shore to promote the flow of water even at its innermost portions. A plurality of pumps 35 are installed on the land for supplying a driving fluid to the water-jet pumps 19, respectively, so that the apparatus may cooperate with one another to produce a circulating stream of water flowing along the shore.

Figure 20:
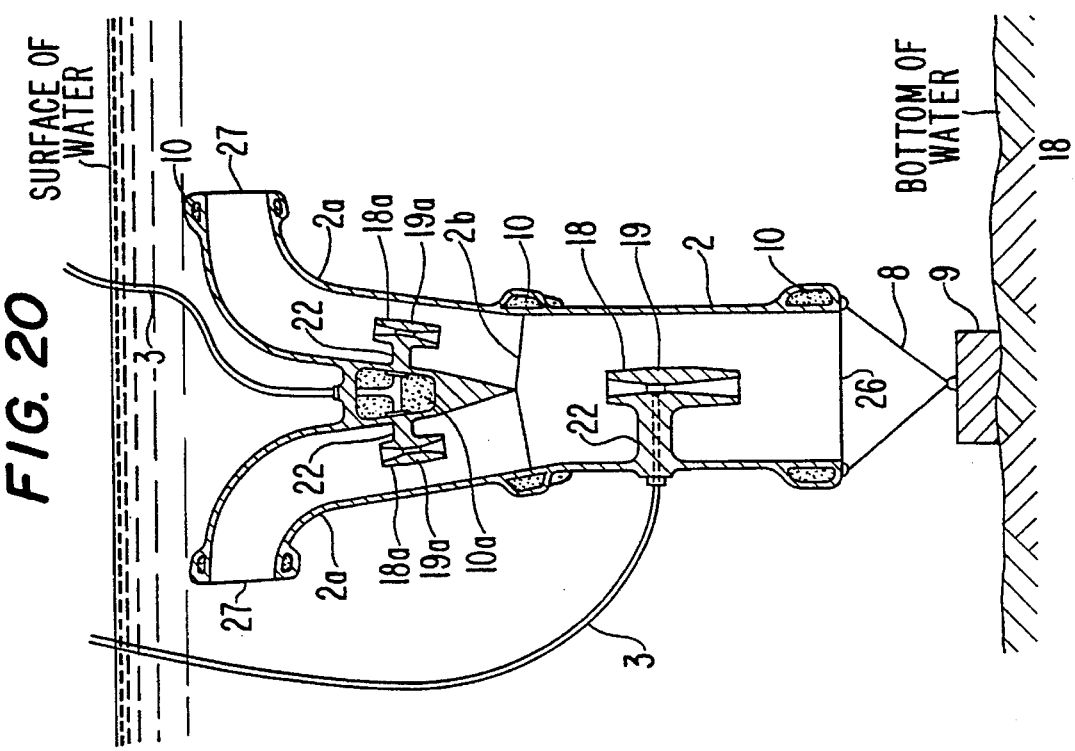
FIG. 20 is a longitudinal sectional view of a fourth embodiment of an apparatus for generating a stream of water according to this invention.

The fourth embodiment of this invention is basically shown in FIG. 20. It comprises a hollow cylinder formed by a main cylinder 2 and two auxiliary cylinders 2a joined to the main cylinder 2 as shown at 2b. A nacelle 18 is supported by a strut 22 in the main cylinder 2 and houses a main water-jet pump 19. A pipe 3 is connected to the water-jet pump.19 for supplying it with a driving fluid. The main cylinder 2 is moored to a sinker 9 by ropes 8. The cylinder has an inlet end 26 defined by the inlet end of the main cylinder 2 and two outlet ends 27 each defined by the outlet end of one of the auxiliary cylinders 2a. The cylinder is provided with a buoyant material 10 around its inlet end 26, its outlet ends 27 and the junction between the main and auxiliary cylinders 2 and 2a, while an auxiliary buoyant material 10a is provided between the auxiliary cylinders 2a. An auxiliary nacelle 18a is supported by a strut 22 in each auxiliary cylinder 2a and houses an auxiliary water-jet pump 19a to which a pipe 3 is connected for supplying a driving fluid. The auxiliary cylinders 2a are curved and extend away from each other, so that the outlet ends 27 may face horizontally in opposite directions when the apparatus is vertically positioned.

The apparatus as hereinabove described has a simple structure and long service life without calling for any particular maintenance, since it does not include any prime mover, or other complicated driving device having a moving part or parts, but relies upon the water-jet pumps 19 and 19a for generating streams of water. It can produce powerful and effective streams of water flowing vertically or horizontally, or in any other directions between vertical and horizontal if it is appropriately positioned. Moreover, it can produce streams of effectively aerated water without the aid of any particular aerating device if air, or a mixture of air and water is used as the driving fluid for the water-jet pumps. The streams leaving the auxiliary cylinders 2a hardly exert any adverse effect on any life under water, since they flow calmly and steadily without loss covered by striking against the air above the surface of a body of water in which the apparatus is installed.

Figure 22:
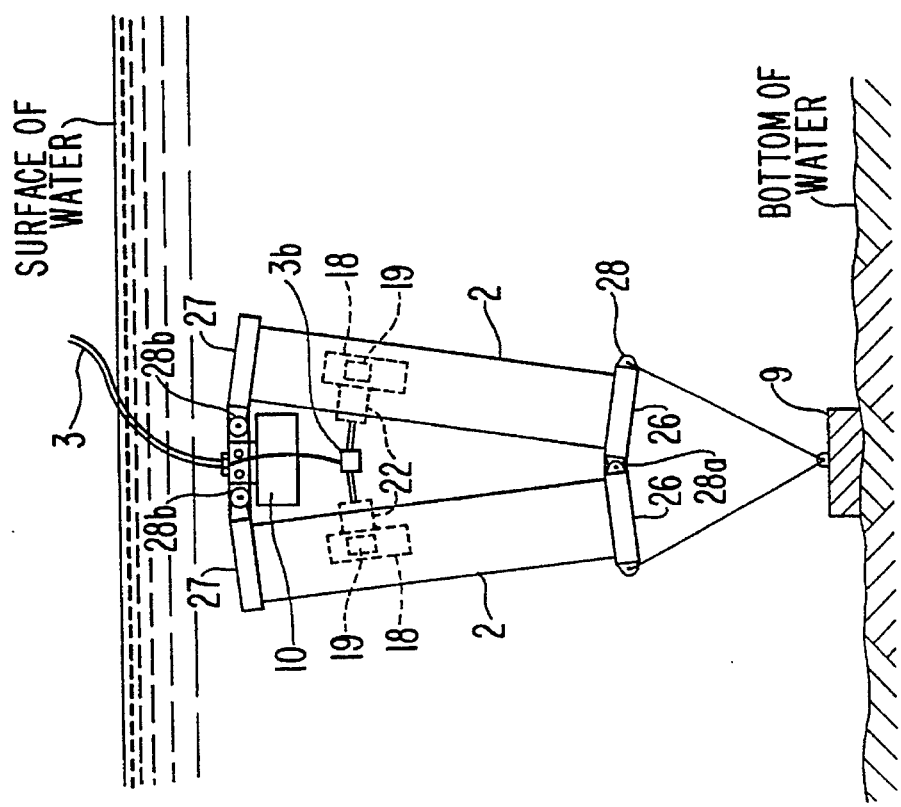
FIG. 22 is a front elevational view of another modified form of the fourth embodiment of this invention.
Figure 21:
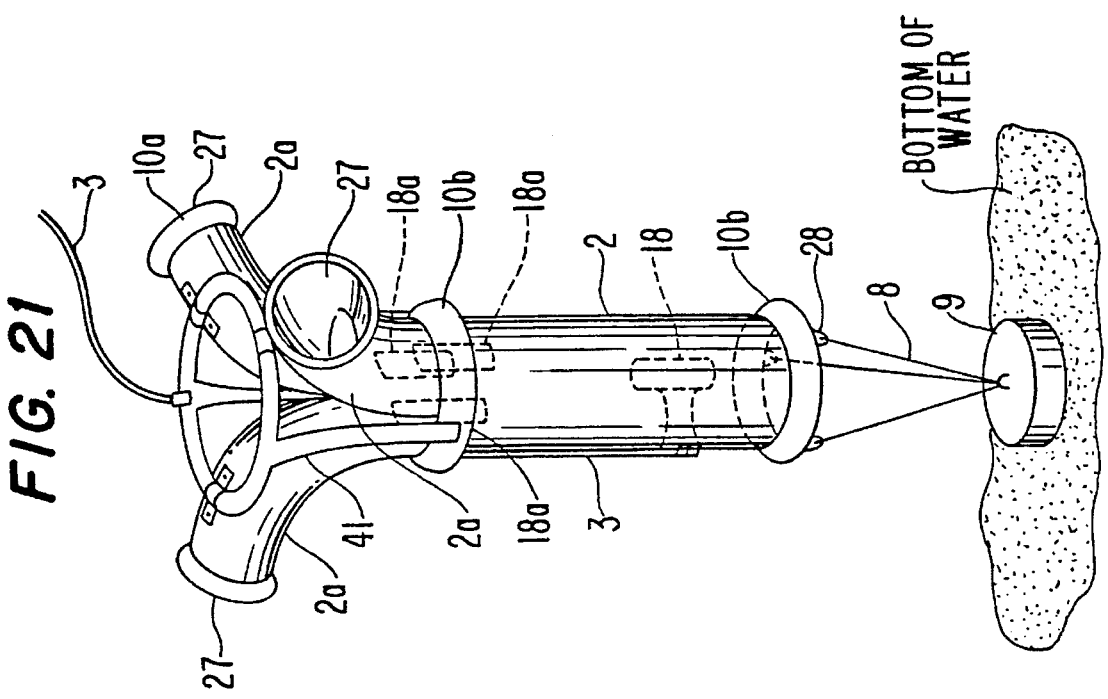
FIG. 21 is a perspective view of a modified form of the fourth embodiment of this invention.
Figure 23:
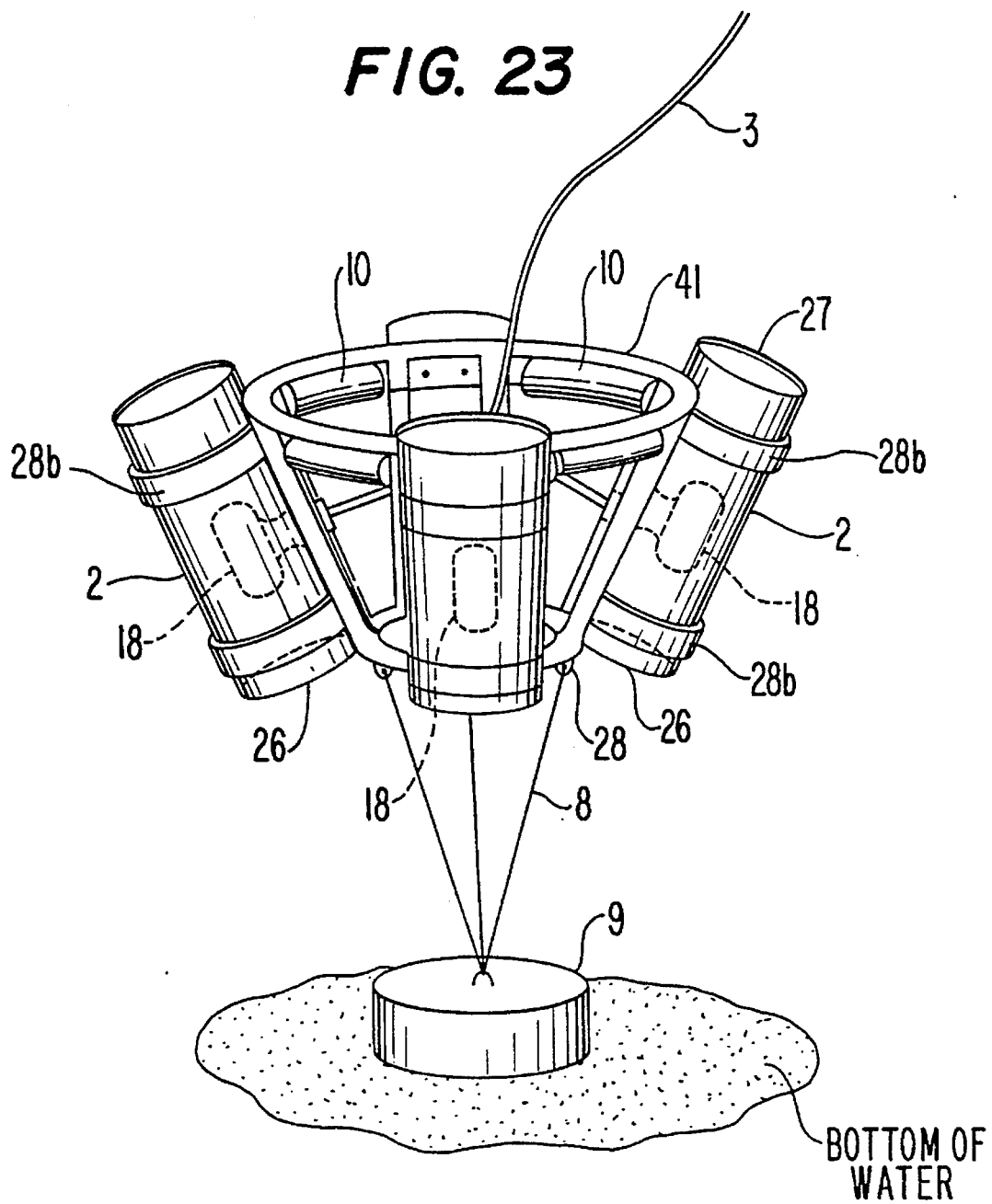
FIG. 23 is a perspective view of still another modified form of the fourth embodiment of this invention.
Figure 25A:
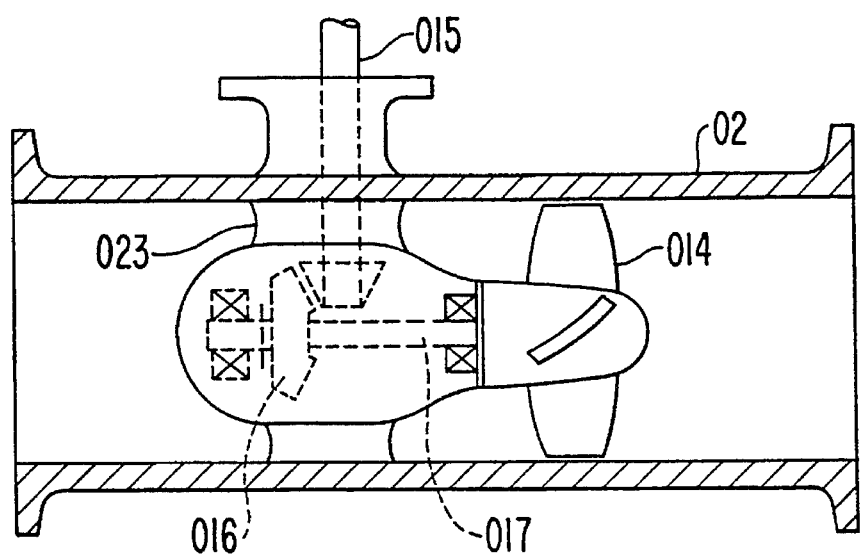
FIGS. 25(a) and 25(b) are each a longitudinal sectional view of another known apparatus.
Figure 25B:
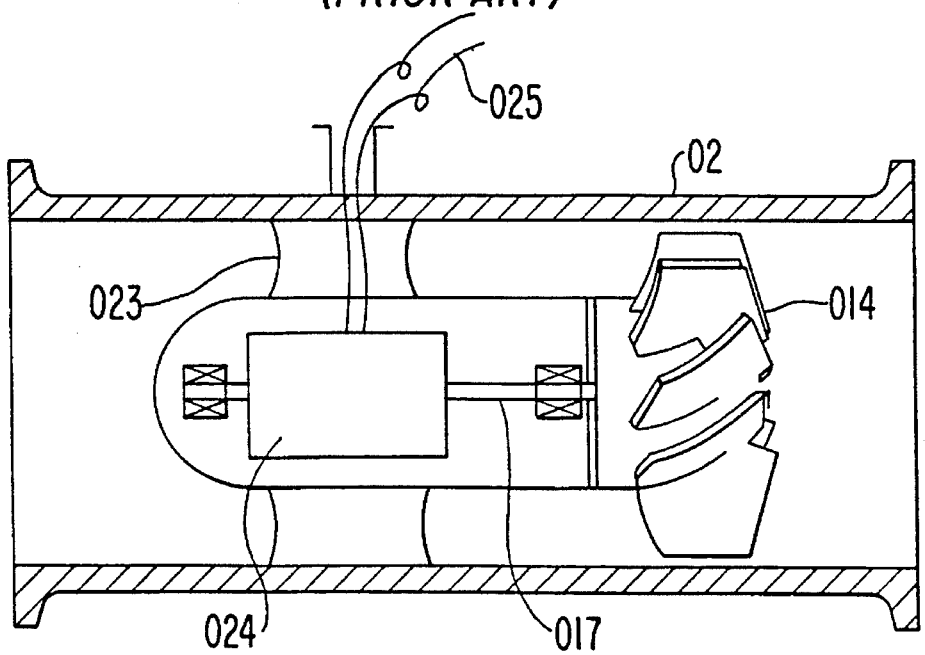

A few modified forms the fourth embodiment of this invention are shown by way of example in FIGS. 21 to 23. The modified apparatus are substantially identical in structure, use and effect to the basic form of apparatus shown in FIG. 20, and, therefore, only the features which differentiate them from the basic apparatus will be described.

The apparatus shown in FIG. 21 has three auxiliary cylinders 2a joined to the upper end of a main cylinder 2 and each containing an auxiliary nacelle 18. The auxiliary cylinders 2a are curved radially outwardly of the main cylinder 2 and define three horizontally facing outlet ends 27 which are equally spaced apart from one another along the circumference of a circle. A buoyant material (not shown) is enclosed in annular projections 10a surrounding the outlet ends 27 of the auxiliary cylinders 2a and the inlet end of the main cylinder 2, and also in a reinforcing ring 10b forming the lower end of a frame 41 to which the auxiliary cylinders 2a are secured. The apparatus can draw up water from the bottom of a body of water and discharge into the area near its surface as streams of water flowing in three different horizontal directions.

The apparatus shown in FIG. 22 has two hollow cylinders 2 disposed substantially vertically, but at an angle to each other, so that their outlet ends 27 may face in two diverging directions. The two cylinders 2 are joined together by plates 28 connected to each other by connecting rods 28a received in eyelets of plates 28. A pipe 3 for supplying a driving fluid is connected to a manifold 3b through which the driving fluid is distributed to a water-jet pump 19 in each cylinder 2. A buoyant material 10 is provided between the two cylinders 2. The apparatus thus has a simple structure and can discharge streams of water in two different directions.

The apparatus shown in FIG. 23 has four hollow cylinders 2 disposed substantially vertically, but at an angle to one another, so that their outlet ends 27 may face in four diverging directions. The cylinders 2 are secured to a frame 41 by metal bands 28b. A buoyant material 10 is carried by the frame 41, while no buoyant material is provided on the cylinders 2. The apparatus thus has a structure and can discharge streams of water in four different directions.

What is claimed is:

1. A method of generating a stream of water in a body of water, said method comprising:

providing an apparatus including at least one tubular member having opposite open ends, one of which ends defines an inlet and the other of which ends defines an outlet, and a nacelle disposed within the tubular member, the nacelle having an inlet port facing towards said inlet of the tubular member and an outlet port facing toward the outlet of said tubular member and a nozzle open to the interior of the nacelle at a location between said ports and directed towards the outlet port;

submerging the apparatus in a natural body of water; and supplying driving fluid to said nozzle under pressure while the apparatus is submerged such that the driving fluid is jetted from the nozzle towards the outlet port of the nacelle to form an accelerated stream within the tubular member which induces a portion of the natural body of water to flow as a stream relative to the remainder of the natural body of water and through the tubular member.

2. A method of generating a stream of water as claimed in claim 1, and comprising disposing the apparatus along a curved path.

3. A method of generating a stream of water as claimed in claim 1, wherein the apparatus is buoyant, and said submerging comprises disposing sinkers, to which the apparatus is tethered, on the bottom of the body of water.

4. A method of generating a stream of water as claimed in claim 1, and further comprising forcing air into the interior of the nacelle such that the portion of the body of water caused to flow as a stream is aerated.

5. A method of generating a stream of water as claimed in claim 4, and comprising disposing the apparatus along a curved path.

6. A method of generating a stream of water as claimed in claim 1, wherein said supplying of driving fluid comprises supplying gas to the nozzle such that the portion of the body of water caused to flow as a stream is aerated.

7. A method of generating a stream of water as claimed in claim 6, and comprising disposing the apparatus along a curved path.

* * * * *